(12) United States Patent
Peters et al.

(10) Patent No.: US 10,589,949 B2
(45) Date of Patent: Mar. 17, 2020

(54) ROBOTIC MANIPULATION USING REUSABLE, INDEPENDENT TAGS

(71) Applicant: Dishcraft Robotics, Inc., San Carlos, CA (US)

(72) Inventors: Kenneth M. Peters, San Mateo, CA (US); Paul M. Birkmeyer, Redwood City, CA (US); Emerald Catherine Ferreira-Yang, Redwood City, CA (US)

(73) Assignee: Dishcraft Robotics, Inc., San Carlos, CA (US)

( * ) Notice: Subject to any disclaimer, the term of this patent is extended or adjusted under 35 U.S.C. 154(b) by 204 days.

(21) Appl. No.: 15/704,817

(22) Filed: Sep. 14, 2017

(65) Prior Publication Data
US 2018/0072523 A1 Mar. 15, 2018

Related U.S. Application Data

(60) Provisional application No. 62/395,214, filed on Sep. 15, 2016.

(51) Int. Cl.
| | |
|---|---|
| *B65C 7/00* | (2006.01) |
| *B65H 9/08* | (2006.01) |
| *B25J 15/06* | (2006.01) |
| *B25J 15/00* | (2006.01) |
| *B25J 15/02* | (2006.01) |
| *B25J 15/04* | (2006.01) |
| *B65C 9/00* | (2006.01) |

(52) U.S. Cl.
CPC .............. *B65H 9/08* (2013.01); *B25J 15/0052* (2013.01); *B25J 15/0213* (2013.01); *B25J 15/0441* (2013.01); *B25J 15/0616* (2013.01); *B65C 7/00* (2013.01); *B65C 2009/0003* (2013.01); *B65H 2405/50* (2013.01); *B65H 2553/52* (2013.01); *B65H 2555/30* (2013.01)

(58) Field of Classification Search
CPC ................ B25J 15/0052; B25J 15/0441; B25J 15/0616; B65H 9/08; B65H 2405/50; B65H 2553/52; B65H 67/063; B65H 67/064; B65C 2009/0003; B65C 7/00
USPC ........................ 700/245; 156/552; 493/375
See application file for complete search history.

(56) References Cited

U.S. PATENT DOCUMENTS

| | | | |
|---|---|---|---|
| 7,264,436 B2 | 9/2007 | Tillmann | |
| 8,491,604 B2 | 7/2013 | Stuart | |
| 8,812,147 B2 * | 8/2014 | Keller | .................. B65G 1/1373 700/215 |
| 9,343,344 B2 | 5/2016 | Kawasaki | |
| 9,623,522 B2 * | 4/2017 | Ziegler | .................. B65H 19/10 |
| 9,789,989 B2 * | 10/2017 | Kuehl | .................. B65B 61/202 |
| 2002/0150450 A1 * | 10/2002 | Bevirt | .................... B01L 3/545 414/225.01 |

(Continued)

*Primary Examiner* — Dalena Tran
(74) *Attorney, Agent, or Firm* — Loza & Loza, LLP

(57) ABSTRACT

A system for robotic manipulation of objects having various shapes and sizes. The system includes a robot having an end effector, and an independent tag. The independent tag may have an object attachment interface to grasp an object, and an end effector attachment interface to mechanically interface with the end effector. Upon actuation of the robot, the end effector may move the object via the independent tag. A corresponding method is also disclosed and claimed herein.

25 Claims, 10 Drawing Sheets

(56) References Cited

U.S. PATENT DOCUMENTS

2009/0012667 A1* 1/2009 Matsumoto ......... G05D 1/0251
701/26
2015/0088300 A1 3/2015 Comau
2015/0290795 A1 10/2015 Oleynik

* cited by examiner

ROBOTIC MANIPULATION USING REUSABLE, INDEPENDENT TAGS

RELATED APPLICATION

This application claims the priority benefit of U.S. Provisional Application Ser. No. 62/395,214, entitled "Robotic Manipulation Using Reusable, Independent Tags," filed on Sep. 15, 2016, the disclosure of which is hereby incorporated by reference herein in its entirety.

BACKGROUND

Field of the Invention

This invention relates to robotics, and more particularly, to robotic manipulation and gripping devices for robots.

Background of the Invention

Since their beginning, industrial robots have been used to move physical objects from place to place. Light-duty robots may be optimized for rapidly moving small, low-mass objects, while larger, more powerful robots may transit bulkier objects over longer distances. For example, small, light-duty robots may grasp and assemble plastics in consumer electronics assembly, while larger, gantry-type robots may be equipped with suction cups or vacuum grippers to move large, flat sheets of plywood, glass, or sheet rock.

Light-duty robots include, for example, Delta robots and Selective Compliance Assembly Robot Arm ("SCARA") robots. Delta robots consist of a hexagonal frame designed to move a small manipulator over a small work space area. These robots are often used for rapid placement of small objects, such as loading ball bearings into bearing races or placing small parts into packaging so that they can be shipped in bulk.

SCARA robots were specifically developed in the early 1980s to carry out rapid, light duty tasks. SCARA robots may be used to readily assemble multiple screws into bolt rings, or to move silicon wafers in clean rooms, for example. At the apex of robotic manipulation throughput are the "pick-and-place" robots used to place surface-mount technology ("SMT") parts during circuit board assembly. Although they operate in extremely controlled environments on highly standardized sets of objects, modern chip placement machines are capable of loading up to 136,000 components per hour in the manufacture of printed circuit boards.

Large robots, on the other hand, may be used to transfer larger payloads over longer distances. Large, multiple-degree-of-freedom robotic arms are widely used in automotive factories for tasks such as moving automobile body panels, or placing heavy components such as engines into car chassis. Another common task for such robots is loading large boxes onto pallets.

Cartesian, or gantry robots, consist of one or more manipulators mounted overhead on a single-degree-of-freedom linear track, or on a multiple-degree-of-freedom x-y stage. A typical use of these robots is one where vacuum grippers are employed to pick up large, flat objects (such as lumber) for stacking in warehouses. Although these large robots are excellent at moving heavy loads, they lack the dexterity and speed of light-duty robots.

In any case, computer vision may be used to identify and locate objects to be grasped. Information from the computer vision system, as well as information from other sensors, may be used to enable the robot to select an optimal method of picking up and moving an object. Sensor information may also be used to maintain a secure grasp of the object as it is moved. While computer vision techniques may be beneficial, however, significant time is required for computer vision systems to both identify objects and for the robot manipulator to achieve a reliable grasp. This additional time has a direct impact on the throughput that robotic systems can achieve.

Grippers also need to be highly specialized and targeted to the type of objects that they are moving. Grippers may include, for example, suction cups, venturi vacuum grippers, pincers, three-fingered hands, and fully articulated five-fingered robotic hands similar to the hands of humans. Such grippers are rarely equally adept at handling all tasks. For example, suction cup grippers used to move large 4×8 sheets of plywood make a poor choice for manipulating a set of machine screws to assemble a consumer appliance. While tool changers may allow a robot to employ different tools for different tasks, tool changing mechanisms are rarely able to exchange entirely different types of grippers. In addition, the time required to exchange tools is often so long that changing grippers on an object-by-object basis is not a viable solution where a high degree of throughput is required.

Accordingly, what are needed are systems and methods to provide targeted grasping mechanisms for objects based on their shape-specific requirements, while also providing a universal interface to quickly and securely move the object once a grasp is obtained. Also what are needed are systems and methods to provide independent, reusable interfaces between a robot and an object. Ideally, such systems and methods would rapidly and reliably grip and move irregularly-shaped objects. Such systems and methods would also quickly and effectively release such objects as appropriate.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
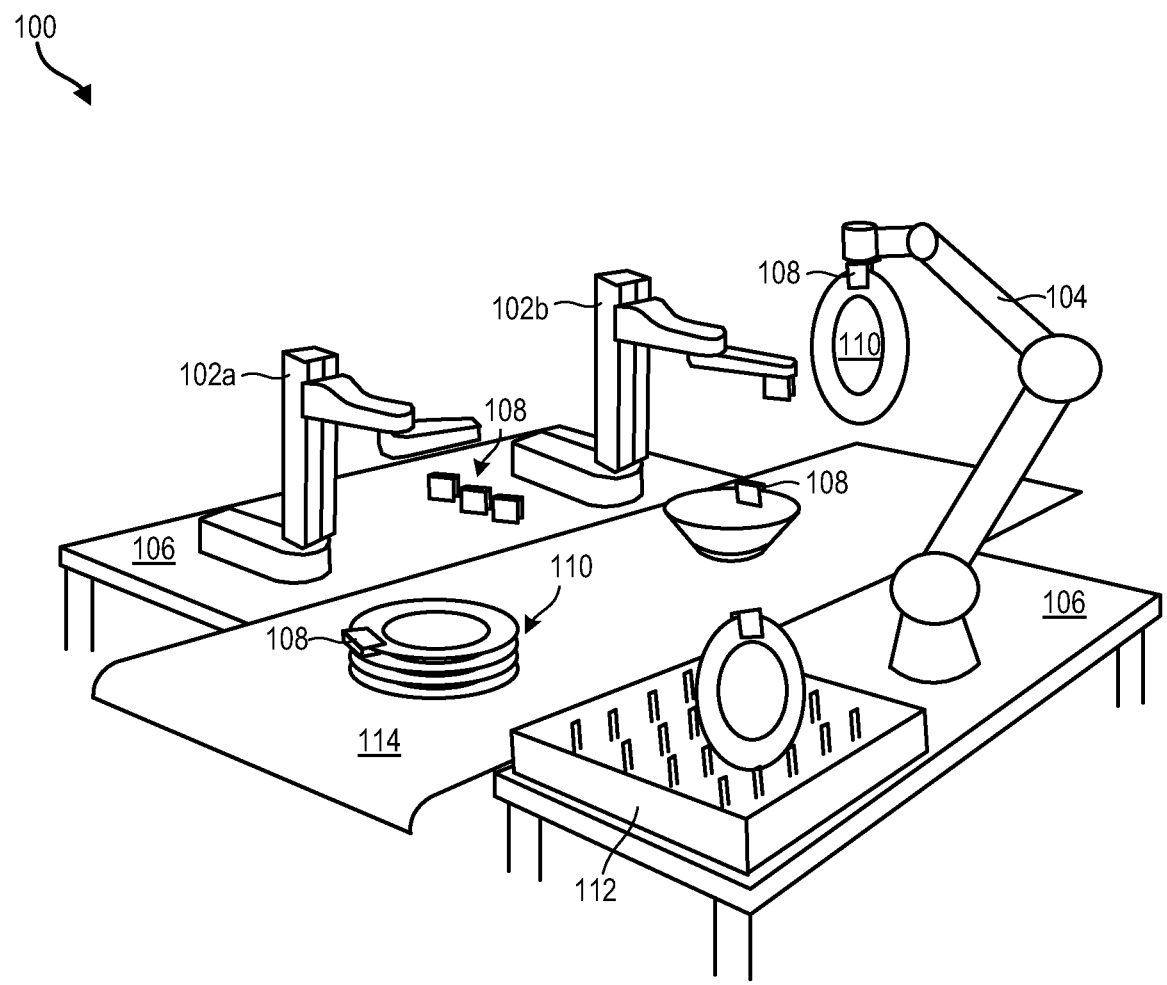
FIG. 1 is a perspective view of one embodiment of a system for grasping and moving an object in accordance with the invention.

Referring to FIG. 1, high-volume commercial dishwashing industries require high-throughput of dishes along an assembly line-type cleaning system, sometimes requiring a throughput as high as one dish every three seconds. Robotics may be implemented to facilitate rapid movement of dishes from one location to another, although multiple robots in parallel may be required to achieve this desired throughput. Using multiple high-dexterity robotic arms in this situation is not only costly, but may also be space-prohibitive.

Embodiments of the present invention may avoid these limitations by allowing multiple light-duty, agile robots, such as low-power/high-dexterity robots, Selective Compliance Assembly Robot Arm ("SCARA"), Delta robots, or the like, to initially attach to the dish or other regularly- or irregularly-shaped object, a "tag" having a grasping mechanism targeted to the specific features and requirements of that object. The tag may also include a universal translation interface to allow the same end effector to connect to and move any object. Such light-duty, low-power robots are considerably less costly than large, high-power robotic arms. Space requirements may also be reduced since multiple, smaller robots can attach tags to objects serviced by a single, large robot or other translation mechanism.

Advantageously, the time it takes for a large transit robot or other translation mechanism to pick up and move the dish may also be reduced. Indeed, the translation mechanism does not have to grasp the dish itself, it only needs to connect to the common mechanical interface, or tag. Since the tag is already securely fastened to the dish and the tag is optimized for very fast, robust attachment to the generalized end effector of the large transit mechanism, the system can very quickly and confidently pick up, move, and release target objects without the complex modeling, motion planning, manipulation feedback, and confidence estimation that traditionally slows unstructured robotic manipulation tasks. The translation mechanism can also apply more rapid accelerations and decelerations to the dish, thereby achieving faster transit times.

As shown in FIG. 1, one embodiment of a system 100 for robotic manipulation in accordance with the present invention may utilize reusable, independent tags, where each tag is entirely independent of any particular object, as well as independent of any particular robot or transit mechanism.

One or more light-duty robots 102a, 102b may be mounted to a table or other work surface 106 and, in some embodiments, may be positioned adjacent to a conveyor belt 114 to facilitate their access to dishes 110 or other objects in an assembly-type line. Light-duty robots 102a, 102b may include, for example, SCARA robots, Delta robots, high-dexterity/low-payload robots, or other light-duty, low-power robots known to those in the art.

Multiple reusable, independent tags 108 may be positioned substantially adjacent to the light-duty robots 102a, 102b. The tags 108 may be identical, or may vary in shape, size, and/or attachment mechanism, as discussed in more detail with reference to FIGS. 5A-5D below. Each tag 108 may comprise an object attachment interface, and an end effector attachment interface. The object attachment interface may allow tags 108 to be automatically or manually affixed to dishes 110 or other objects, as desired. The object attachment interface may implement non-permanent gripping mechanisms, enabling tags to be removably coupled to such dishes 110 or other objects and thereby facilitate the tags' reuse. Specific object attachment interfaces that may be used to removably couple a tag to various objects are discussed in greater detail below. The end effector attachment interface of the tag 108 may enable a large transit robot, such as a multiple-degree-of-freedom robotic arm 104, to automatically grasp the tag 108 and associated dish 110 or other object quickly and securely.

In some embodiments, the light-duty robots 102a, 102b may use computer vision to analyze dishes 110 requiring a tag 108, and to distinguish between multiple available tags 108. The light-duty robots 102a, 102b may process this information to determine an appropriate tag 108 type and/or location for placing the tag 108 on the dish 110 based on the characteristics and features of the target dish 110, as well as its torque requirements. In other embodiments, a human operator may select and/or apply an appropriate tag 108 to the dish 110 or other object.

In one embodiment, as shown in FIG. 1, dishes 110 arranged on the conveyor belt 114 include a bowl and a stack of plates. Each of the light-duty robots 102a, 102b may analyze a dish 110 adjacent to it, or a next dish 110 in line, to determine an appropriate tag 108 (based on the features and requirements of the dish 110) from the multiple available tags 108. The light-duty robots 102a, 102b may then apply one or more appropriate tags 108 to each dish 110. As shown, for example, a first light-duty robot 102a may select and apply a clamp-type tag 108 to an edge of a plate, while a second light-duty robot 102b may select and apply a similar tag 108 to an edge of a bowl.

A large transit robot, such as robotic arm 104, may be mounted to a table or other work surface 106 substantially opposite the light-duty robots 102a, 102b. The robotic arm 104 may include an end effector, which may be coupled to an actuator. Since tags 108 have been previously securely attached to target objects as discussed above, the universal end effector attachment interface of the tags 108 may easily automatically connect with the end effector or actuator. In this manner, the end effector attachment interface of the tags 108 may allow the associated object to be grasped quickly and securely. The robotic arm 104 or other transit mechanism may then move the dish 110 or other object to another location, such as a dish rack 112.

In operation, the robotic arm 104 may manipulate dishes 110 equipped with tags 108 to place them in a dish rack 112, while the light-duty robots 102a, 102b or human operators may continue to apply tags 108 to remaining dishes 110. After a particular dish 110 has been placed in the dish rack 112 or has reached another final destination, its associated tag 108 may be released from the dish 110 by any means known to those in the art. Tags 108 may then be cleaned or sanitized, and reused as desired.

Figure 2:
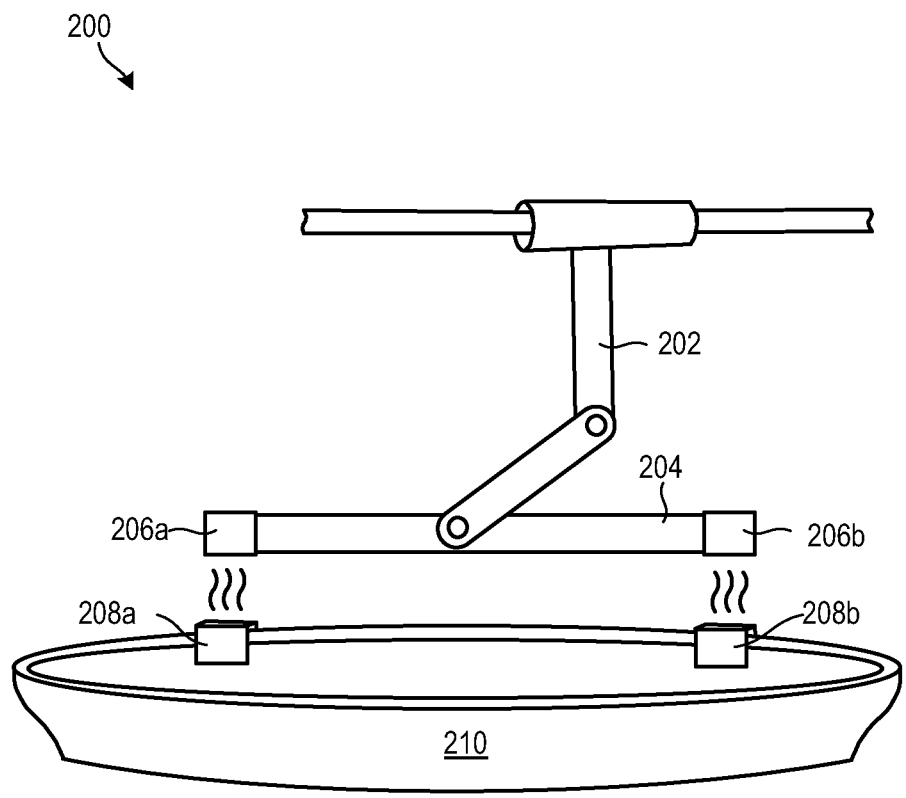
FIG. 2 is a perspective view of one embodiment of a robot utilizing a single end effector to engage multiple independent tags in accordance with the present invention.

Referring now to FIG. 2, in some embodiments a robot 200, such as a gantry robot, may be used to move dishes 210 or other objects from one location to another. As shown, the robot 200 may include an arm 202 having an end effector 204. As shown, the arm 202 includes a double-ended end effector 204. The double-ended end effector 204 may extend substantially perpendicularly, or in a horizontal position relative to the arm 202, and may include a magnetic actuator 206a, 206b at each end. A magnetic field may be applied by each magnetic actuator 206a, 206b to attract one or more ferromagnetic tags 208a, 208b attached to an object.

In the illustrated embodiment, a gantry robot 200 may automatically engage two ferromagnetic tags 208a, 208b attached to a dish 210 to provide a secure grasp of the dish 210, and to minimize the torque that would be produced if the dish 210 were grasped from only one tag 208a. The tags 208a, 208b may be placed on the dish 210 by light-duty robots or other operators such that the tags 208a, 208b substantially correspond to the positions of magnetic actuators 206a, 206b on the double-ended end effector 204. The magnetic actuators 206a, 206b may thus quickly and reliably grasp the ferromagnetic tags 208a, 208b and associated dish 210. Of course, various types of actuators may be implemented to mechanically engage corresponding tags 208, and embodiments of the invention are not limited to the magnetic actuators 206a, 206b and ferromagnetic tags 208a, 208b depicted.

Figure 3:
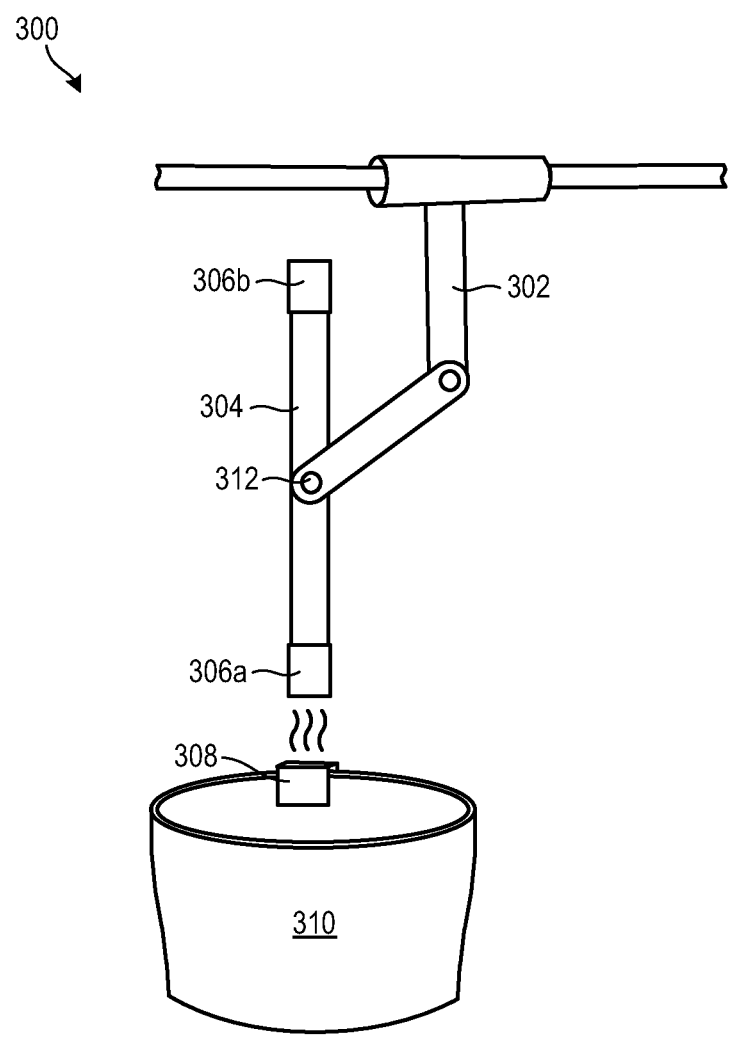
FIG. 3 is a perspective view of another embodiment of a robot utilizing an end effector to engage a single independent tag in accordance with the present invention.

Referring now to FIG. 3, in another embodiment, a robot 300, such as a gantry robot, may include an arm 302 attached to a double-ended end effector 304. One or both ends of the double-ended end effector 304 may include a magnetic, mechanical or other type of actuator 306a, 306b coupled thereto.

In this embodiment, the double-ended end effector 304 may be adapted to rotate about an attachment point 312 connecting the double-ended end effector 304 to the arm 302. In this manner, the double-ended end effector 304 may be adjusted to extend in a substantially parallel, or vertical position relative to the arm 302, such that only one magnetic actuator 306a may be positioned to properly engage a ferromagnetic tag 308. In other embodiments, the double-ended end effector 304 may be fixed in a substantially parallel or vertical position relative to the arm 302, such that only one magnetic actuator 306a may be maintained in a position to engage a ferromagnetic tag 308.

In any case, one magnetic actuator 306a may be positioned proximal to a ferromagnetic tag 308 attached to a dish 310. The magnetic actuator 306a may automatically engage a single tag 308 to secure a grasp on the dish 310.

Advantageously, this embodiment may allow a gantry robot 300 or other type of transit robot to dynamically adjust as needed to secure a grasp on a dish 310 based on its torque requirements. A dish 310 with significant torque requirements may be grasped by both magnetic actuators 306a, 306b of the double-ended end effector 304, while a dish 310 with less significant torque requirements, such as a bowl, may be grasped by a single magnetic actuator 306a of the double-ended end effector 304. In other embodiments, one or more robots 300 may include multiple end effectors 304 to cooperatively attach to multiple tags 308 substantially simultaneously to improve stability of the grasp and reduce torque on the tags 308 to acceptable levels. Tag 308 placement efficiencies may be maximized by matching a grasping technique to a minimum number of tags 308 needed to achieve a secure grasp of the dish 310 or other object.

Figure 4:
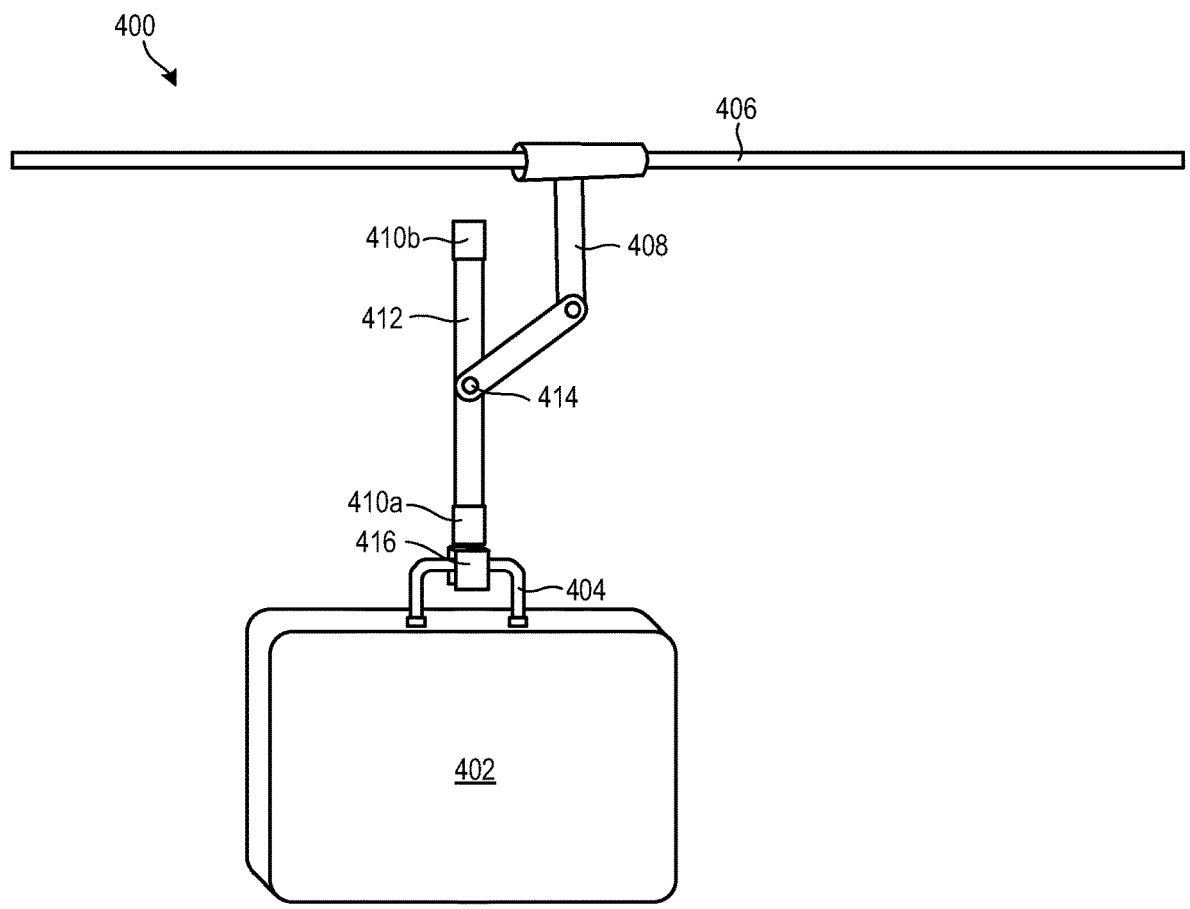
FIG. 4 is a perspective view of a robot moving a piece of luggage in accordance with embodiments of the invention.

Referring now to FIG. 4, in one embodiment, a large transit robot 400 may be provided to move a piece of luggage 402 from one location, such as a check-in area of an airport or interior storage area of an airplane, to another location, such as a luggage collection area or baggage cart. Like the robots of FIGS. 2 and 3, the large transit robot 400 may be a gantry robot having an arm 408 attached to an end effector 412 at an attachment point 414. One or both ends of the end effector 412 may include an actuator 410a, 410b, such as a magnetic actuator or other type of actuator known to those in the art, to mechanically engage an independent tag 416.

An independent tag 416 may be manually or automatically attached to a piece of luggage 402 or other object. Tags 416 may be applied manually by people, automatically attached, or included in the packaging of an object. For example, in some embodiments, tags 416 may be included as part of the box or other packaging of warehouse items, luggage at an airport, or any other objects known to those in the art.

As discussed in more detail below with reference to FIGS. 5A-D, an independent tag 416 may include at least one object attachment interface adapted to attach to the object. In fact, as shown herein, a significant advantage of the present invention is that the object attachment interface can be highly specialized to the object being acquired. For example, clamping mechanisms that attach to the object may be spring-loading, gear driven, magnetic, electrostatic, pneumatic, hydraulic, or press fit. Other object attachment interfaces can employ multiple fingers, one or more suction cups, temporary adhesives, jamming style grippers, or inflatable bladders. Further, in some embodiments, phase change materials can be used that adapt to the contour of the object being acquired, and then can become rigid with a change of a physical property such as temperature or electric field. In other embodiments, object attachment interfaces may use cinching mechanisms similar to the "Chinese finger trap," nets, lassos, or could be designed to achieve purchase on the object by any other means known to those in the art.

In some embodiments, the orientation of a double-ended end effector 412 relative to the arm 408 may dynamically adjust as needed to secure a grasp on a piece of luggage 402 based on its torque requirements. A heavy, awkward, or irregularly-shaped piece of luggage 402 with significant torque requirements may require more than one independent tag 416 to ensure a stable grasp. In this case, the double-ended end effector 412 may be oriented in a horizontal position such that more than one actuator 410a, 410b may be positioned to engage corresponding tags 416. On the other hand, a piece of luggage 402 with less significant torque requirements, such as a suitcase with a centrally located handle 404, may require only a single independent tag 416. In this case, as shown, the double-ended end effector 412 may be oriented in a substantially vertical position such that a single actuator 410a may be substantially aligned with the independent tag 416 to facilitate a quick and secure grasp. Upon achieving a secure grasp, the large transit robot 400 may transfer the piece of luggage 402 from one location to another via a long transit 406.

Referring now to FIGS. 5A-5D, various types of independent tags 500 may be used in accordance with embodiments of the invention. Importantly, independent tags 500 may include at least one object attachment interface 502 to grip an object, and one or more end effector attachment interfaces 508 to mechanically interface with a robotic actuator. While the object attachment interface 502 may include any of various grasping technologies to facilitate a quick and reliable grasp on various objects, the end effector attachment interface 508 may be standardized to mechanically interface or connect with a particular type of actuator. In this manner, a robot may quickly and reliably grasp one or more independent tags 500 to easily and reliably secure an object for transport. Of course, the illustrated embodiments of independent tags 500 provided herein are shown by way of example and not limitation, and an independent tag 500 may include any grasping technology and/or mechanical interface known to those in the art.

Figure 5A:
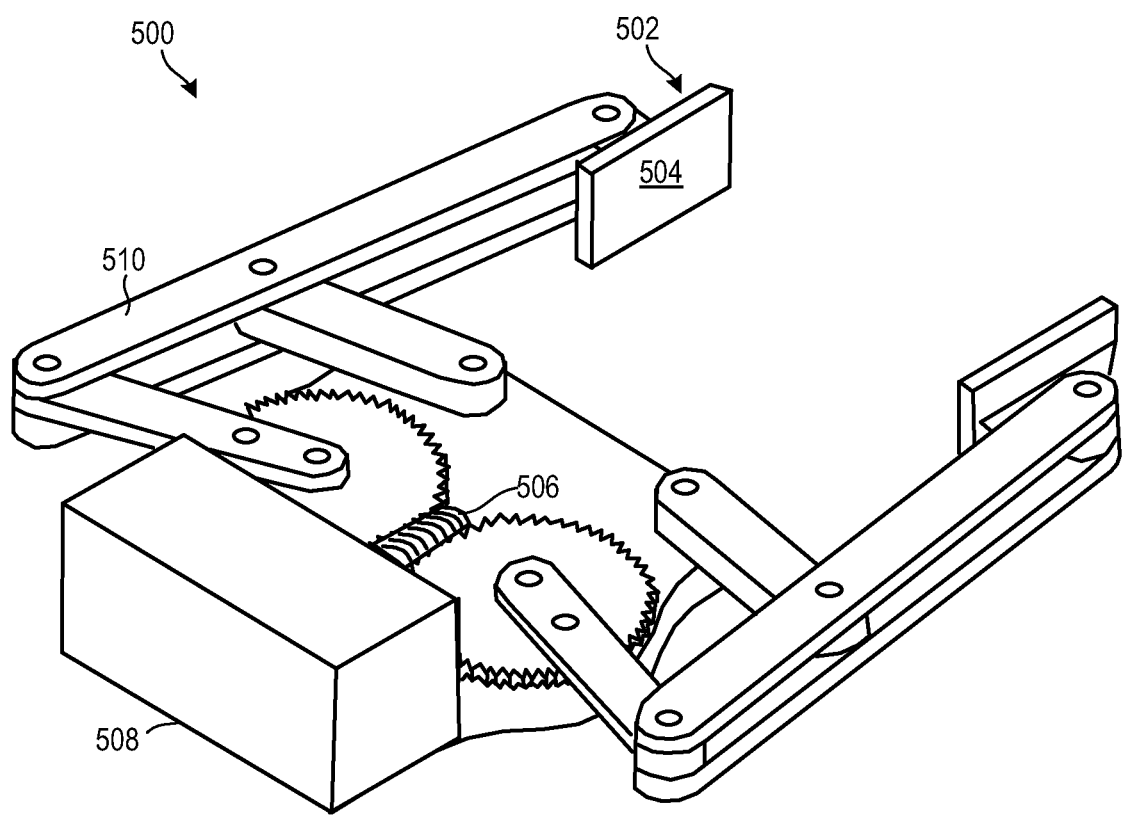
FIG. 5A is one embodiment of an independent tag in accordance with the invention.

In one embodiment, as shown in FIG. 5A, an object attachment interface 502 of an independent tag 500 may include a four bar linkage mechanism to attach to an object for transport. Upon actuation, an internal motor may power a worm gear 506 that causes the four bar linkage 510 to extend. Pincers 504 attached to the four bar linkage may be forced together, thereby creating a gripping action to effectively grip an object.

An end effector attachment interface 508 of the independent tag 500 of FIG. 5A may include a ferromagnetic material, for example, to magnetically interface with a magnetic actuator of a robot. In other embodiments, an end effector attachment interface 508 may include any mechanical features or elements adapted to quickly and reliably interface with an actuator or end effector having mating characteristics.

Figure 5B:
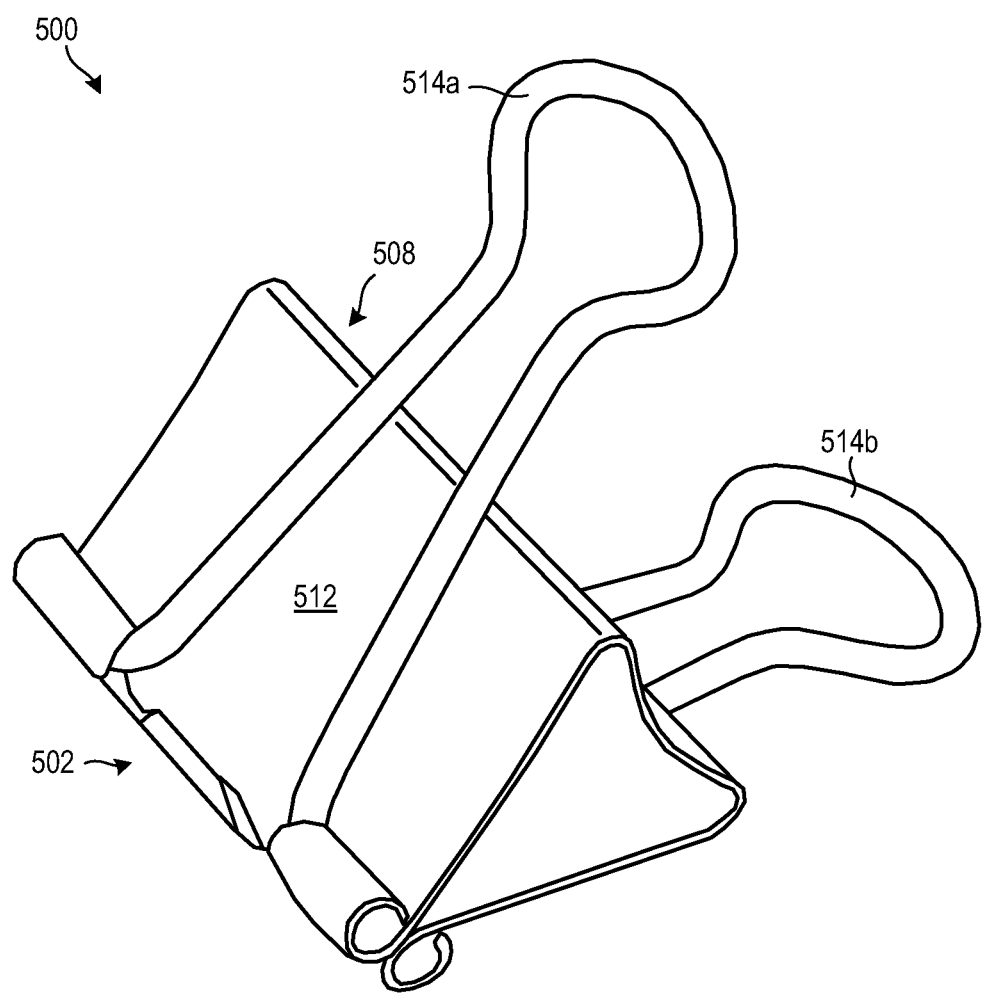
FIG. 5B is another embodiment of an independent tag.

Referring to FIG. 5B, an alternative embodiment of an independent tag 500 may include a simple clip mechanism that may be used as a spring tag 500. In this embodiment, the gripping force of the object attachment interface 502 of the independent tag 500 is provided by U-shaped spring steel. Grips 514a, 514b on either side of a body 512 of the tag 500 may be manually or automatically pressed toward each other, against the force of the spring. In this manner, the object attachment interface 502 of the independent tag 500 may open to attach to an object, similar to the operation of a binder clip.

An end effector attachment interface 508 of the tag 500 may provide a standardized magnetic interface with a magnetic actuator. Indeed, in this embodiment, the tag 500 is made of spring steel, a ferromagnetic material. A magnetic field may be applied by the magnetic actuator when in proximity to the tags 500, thereby causing the magnetic actuator to magnetically interface with the end effector attachment interface 508 to grasp the tag 500. The independent tag 500 may thus be quickly located, grasped, and released by a robotic actuator or end effector as desired.

Figure 5C:
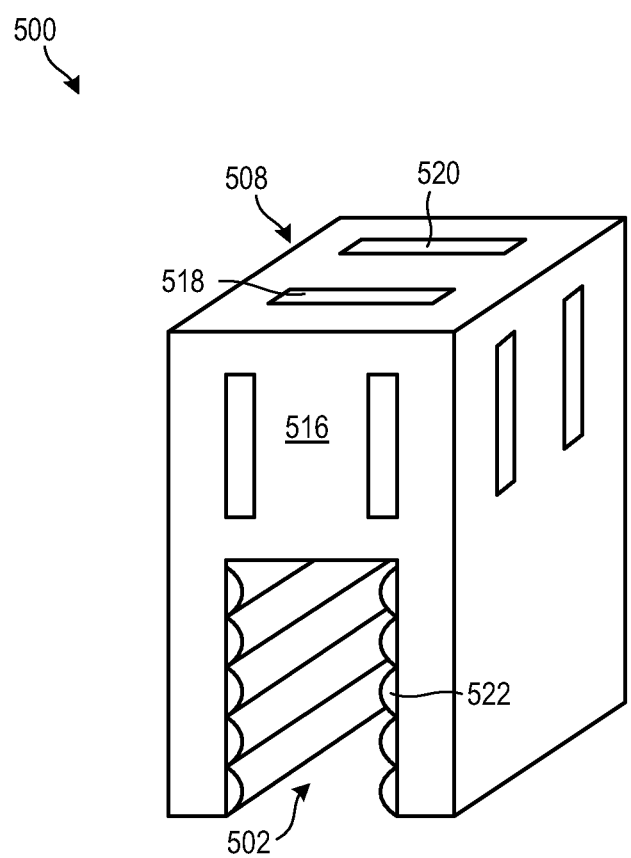
FIG. 5C is a third embodiment of an independent tag.

Referring now to FIG. 5C, another embodiment of an independent tag 500 in accordance with the invention may include a substantially cubical tag 500, where the object attachment interface 502 comprises a gripping mechanism that protrudes from a substantially cubical body 516. The cubical body 516 may include more than one end effector attachment interface 508. In some embodiments, an end effector attachment interface 508 is included on each of the other five sides of the cubical body 516.

As shown, the object attachment interface 502 may include grippers 522 made to open and close by a motor and gear drive mounted within the cubical body 516. In one embodiment, the end effector attachment interface 508 may include a positive electrical contact 518 and a negative electrical contact 520. These contacts 518, 520 may be designed to mate with corresponding positive and negative electrical contacts on a robotic actuator to provide power to the motor and gear drive inside the cubical body 516. Upon activation, the motor and gear drive may cause the grippers 522 to open or close. In some embodiments, the polarity of the electrodes may be reversed by rotating the robotic actuator one hundred eighty degrees to release the tag 500 from the object. Additionally, in certain embodiments, the electrical contacts 518, 520, or alternate electrical contacts, may be used to transmit data to and/or from an independent tag 500.

Maintaining the power supply and/or drive mechanism in the actuator greatly reduces the complexity of a tag 500. For example, an independent tag 500 is generally much more compact and less costly to build than a comparable, fixed robotic manipulator. Since tags 500 can remain attached to objects in a powered-down state, robots may work collaboratively to increase system throughput.

In one embodiment, for example, two light-duty robots may tag objects to be transported by a large robotic arm over a certain distance. If the robotic arm is delayed in releasing a particular object, the two light-duty robots may continue applying tags 500 to objects to build up a queue of objects for the robotic arm. Spring-loaded, gear-driven, pneumatic, and hydraulic tags 500 may each be designed to maintain their grip after an associated power source has been removed.

Figure 5D:
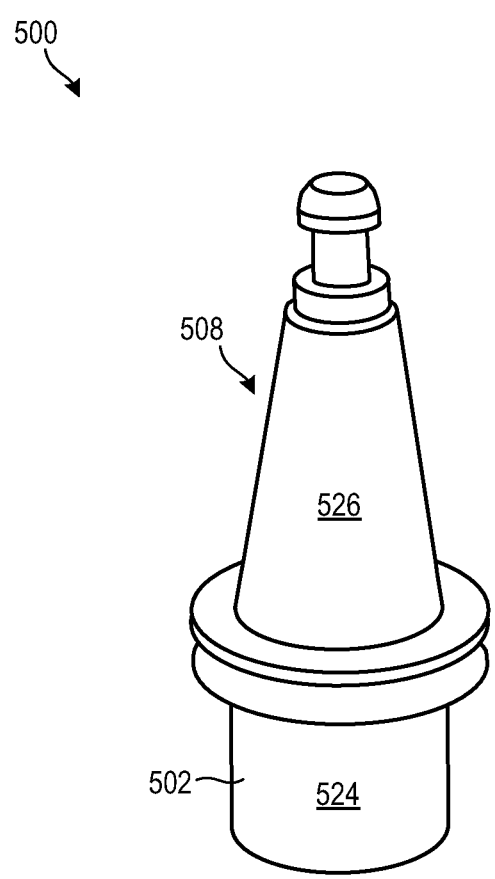
FIG. 5D is a fourth embodiment of an independent tag.

Referring now to FIG. 5D, another embodiment of an independent tag 500 is shown where the object attachment interface 502 of the tag 500 comprises a vacuum gripper 524 and the end effector attachment interface 508 includes a tapered collet and pin 526. The vacuum gripper 524 may include a substantially circular ring to apply vacuum suction to grasp an object. The vacuum gripper 524 may be constructed of metal, a substantially flexible, elastomeric material, or any other suitable material known to those in the art.

The tapered collet and pin 526 may be designed to mechanically mate with a corresponding socket of an end effector or actuator, in much the same way as CNC milling machines perform tool changes. In this manner, the tapered collet and pin 526 may mechanically interlock with mating features of the end effector or actuator to securely grasp and move the object.

In certain embodiments, other design attributes and features may be included in an independent tag 500 to improve the ability of a robot or end effector to locate and retrieve a tag 500. For example, independent tags 500 may be painted with highly reflective or light-absorbing surface to facilitate a computer vision system's ability to locate a tag 500 against a background. In other embodiments, fiducial marks and/or optical patterns may be applied to an independent tag 500 for the same purpose.

Further, in some embodiments, tags 500 may include data holding elements such as RFID, bar codes, QR codes, or the like. In other embodiments, tags 500 may include an onboard memory element transmitting over a wireless protocol, such as Bluetooth® LE, WiFi, RFID, or other wireless communications protocol. This data may be used to assist a robotic system in locating and retrieving an object. In some embodiments, this data may also be updated to record the status of the tagged object as it moves from one station to another in a multi-stage process.

In the embodiment of FIG. 5D, the end effector attachment interface 508 may be constructed of a flat plate of steel or other ferromagnetic material to enable the tag 500 to be picked up by a end effector or robotic actuator containing a permanent magnet or electromagnet. In this manner, the tag 500 may provide a consistent, reliable, high-force attachment point so that the object can be moved with greater speed than could otherwise be achieved.

Figure 6:
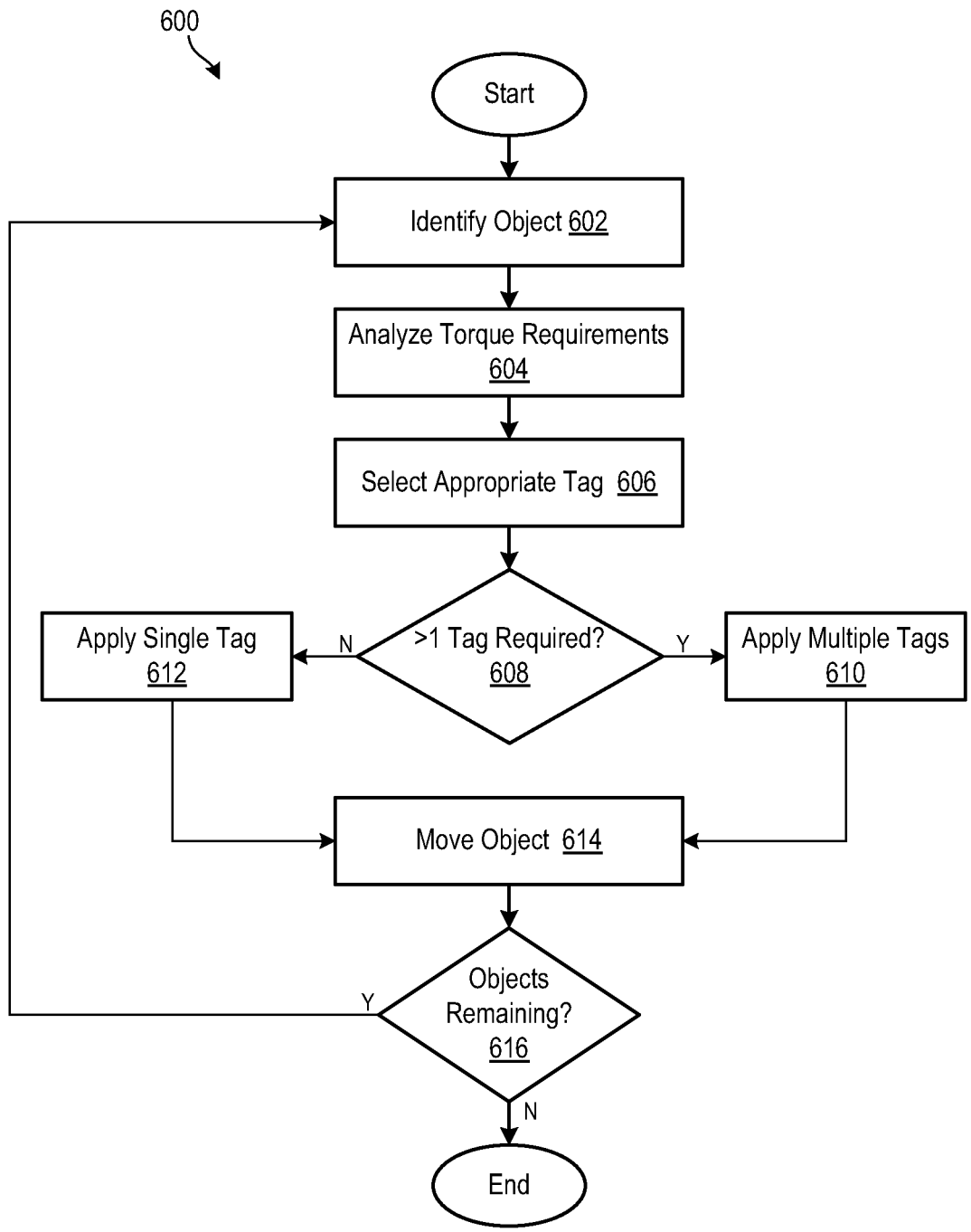
FIG. 6 is a process for applying independent tags to an object in accordance with one embodiment of the invention.

Referring now to FIG. 6, a process 600 for robotic manipulation using reusable, independent tags in accordance with the invention may include identifying 602 an object to be moved. In some embodiments, a robot may use computer vision to identify 602 the object. In alternative embodiments, a human operator may identify 602 the object, or the identification 602 of the object may be pre-set for the particular system. In other words, in some embodiments, the system may be designed for only one type of object, thereby negating the need for dynamic identification 602 of objects.

Mass and/or torque requirements may then be analyzed 604 by a robot or human operator, or may be automatically associated with the identified 602 object. Mass and torque requirements may be determined by analyzing the object's weight, measurements, shape, weight distribution, and the like.

The process 600 may then select 606 an appropriate tag from an assortment of situationally-designed grippers or tags. Selection 606 of an appropriate tag may be based on computer vision analysis of the object, including its mass and torque requirements. Similarly, based on the mass and torque requirements of the object, the process 600 may determine 608 whether more than one tag is required to securely grasp the object. In certain embodiments, the process 600 may also determine an optimal location for applying the tag to the object.

If only one tag is required, a robot or other operator or mechanism may apply 612 a single tag to the object at an optimal location for achieving a secure grasp. If more than one tag is required, the robot or other operator or mechanism may apply 610 multiple tags to the object. Each tag may be applied at a location such that the tags may cooperate to provide a secure grasp of the object.

After the tags have been applied, the object may be moved 614 from one location to another. In some embodiments, more than one robot may cooperate to execute complicated, multi-step processes. Indeed, since attaching to the common tag interface is more reliable and faster than requiring each robot to individually grasp and manipulate an object, systems of multiple robots can be provided to move 614 objects with high levels of throughput and reliability not otherwise attainable.

After moving 614 the object, the process 600 may query whether 616 additional objects remain. If yes, the process 600 may continue to identify 602 a next object for tagging and manipulation. If no, the process 600 may end.

Figure 7:
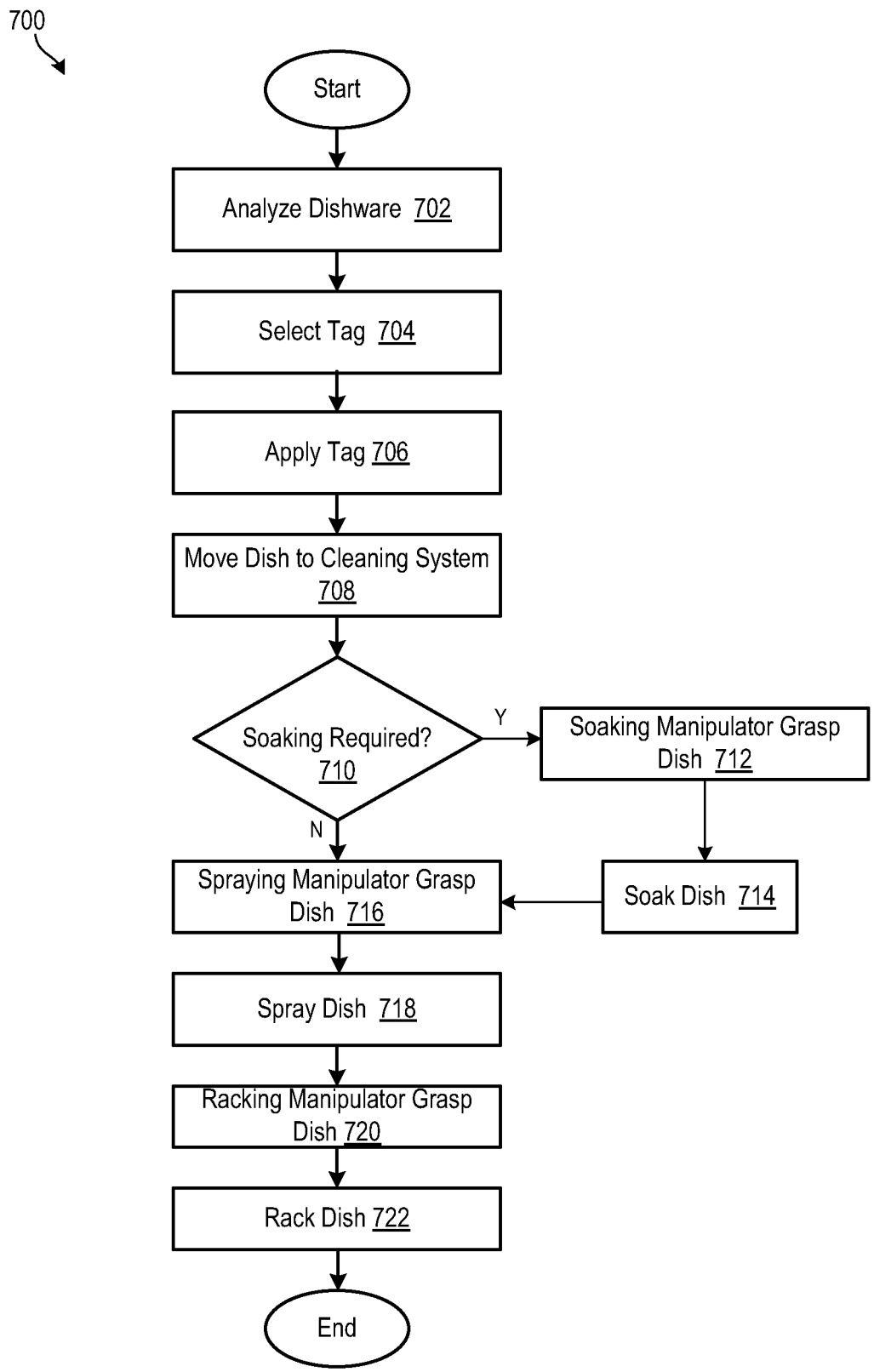
FIG. 7 is a process for applying independent tags to dishes in a commercial dishwashing operation in accordance with embodiments of the invention.

FIG. 7 illustrates a process 700 for a multi-stage commercial dishwashing operation in accordance with the present invention. This process 700 may implement the common physical interface of a tag to streamline coordination of multiple robotic elements or multiple stages of mechanical automation. In this embodiment, a multi-stage process 700 that sorts, washes and racks dishes is described, although the process 700 may be implemented in various other industries such as factory automation, food processing, packaging, or any process for performing multiple sequential operations on objects, including irregularly-shaped objects.

In operation, the process 700 may utilize computer vision or other analysis technique known to those in the art to analyze 702 dishware based on its size, shape, weight, and/or other features and characteristics. The results of this analysis 702 may be used to select 704 an appropriate tag to apply to the target dish. At least one side of the tag may include a standardized mechanical interface to enable the tag to be quickly and easily retrieved by a robotic actuator. One or more other sides of the tag may include a gripper to attach to an object. Grippers may vary in size, shape, and attachment mechanism. Because the tag isolates the gripping element from the standardized mechanical interface, the types of tags and associated gripping mechanisms that a robotic actuator has available to grasp and move objects is increased. Thus, a tag may be particularly selected 704 for an object based on its unique properties and gripping mechanism to optimize the grasp of the tag on the object.

The selected tag may be applied 706 to the dish using a light-duty robot such as a SCARA robot, for example. In certain embodiments, the selected tag may be applied to the dish by a human operator or other attachment mechanism. The tagged dish may then be moved 708 to a cleaning system using a robotic arm or other manipulator. Specifically, an actuator attached to an end effector of the robotic arm may mechanically attach to the tag to secure a grasp on the object and move the object as desired.

Upon entering the cleaning system, the robotic arm or other manipulator may intelligently determine whether the dish requires soaking 710. If yes, a soaking system robot or other manipulator may grasp 712 the dish by its tag, soak 714 the dish in the soaking system, and then transfer the dish to a spraying system manipulator. If no, the dish may be transferred 716 directly to the spraying system without soaking.

If the dish requires soaking, the dish may be transferred 716 to the spraying system after soaking. A spraying system manipulator may grasp 716 the dish by the attached tag to transfer it to the spraying system. The spraying system may then spray 718 the dish and leave it in a position where a racking robot or manipulator can grasp 720 the dish again, using the attached tag. The racking manipulator may then place 722 the dish in a rack for further cleaning or drying.

At the end of the process 700, the tag may be selectively released from the object. In some embodiments, a tag may be released by switching the tag from one stable configuration to another. For example, in one embodiment, two steel pads may magnetically attach to each other to form the tag gripping mechanism. A voltage may be applied across the pads to clamp the tag to the object, and a reverse current may be applied to cause the tag to release. Of course, this is just one exemplary embodiment, and any gripping mechanism and/or release mechanism known to those in the art may be used in connection with the tags described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system, comprising:
a robot having an end effector; and
an independent tag having an object attachment interface to grasp an object and an end effector attachment interface to mechanically interface with the end effector, wherein the end effector moves the object upon actuation of the robot.

2. The system of claim 1, wherein the object attachment interface removably couples the independent tag to the object.

3. The system of claim 1, wherein the robot comprises one of a robotic arm, a gantry robot, a SCARA robot, and a delta robot.

4. The system of claim 1, wherein the object is one of a dish and a piece of luggage.

5. The system of claim 1, wherein a plurality of independent tags are coupled to the object to mechanically interface with at least one actuator.

6. The system of claim 5, wherein each of the plurality of independent tags comprises a unique object attachment interface.

7. The system of claim 1, wherein the robot comprises a multi-stage machine to move the object from stage to stage.

8. The system of claim 1, further comprising at least one light-duty robot to attach the object attachment interface of the independent tag to the object.

9. The system of claim 8, wherein the at least one light-duty robot further analyzes the object to select, from a plurality of independent tags, the independent tag, wherein the independent tag comprises an optimal object attachment interface for grasping the object.

10. The system of claim 1, wherein the object attachment interface is selected from the group consisting of a clamping mechanism, at least one finger, at least one suction cup, an adhesive, a jamming-style gripper, an inflatable bladder, a phase-change material, a cinching mechanism, a net, and a lasso.

11. The system of claim 1, wherein the independent tag is coupled to packaging material for the object.

12. The system of claim 1, wherein the independent tag comprises at least one of a readable and writable data element.

13. The system of claim 1, wherein the end effector attachment interface comprises at least one of a magnetic interface and a mechanical interface.

14. The system of claim 1, wherein the independent tag comprises more than one end effector attachment interface.

15. A method, comprising:
coupling an independent tag to an object, the independent tag having an object attachment interface to grasp the object and an end effector attachment interface to mechanically interface with an end effector of a robot;
positioning the end effector proximal to the end effector attachment interface;
actuating the end effector to connect with the end effector attachment interface; and
actuating the robot to move the object.

16. The method of claim 15, further comprising releasing the independent tag from the end effector.

17. The method of claim 15, further comprising decoupling the independent tag from the object.

18. The method of claim 17, wherein at least one of coupling and decoupling the independent tag is performed by one of light-duty robot and a human operator.

19. The method of claim 15, further comprising serially moving the object from stage to stage.

20. The method of claim 19, wherein the independent tag remains coupled to the object as it is moved from stage to stage.

21. The method of claim 15, wherein coupling the independent tag comprises coupling a plurality of independent tags to the object to mechanically interface with at least one end effector.

22. The method of claim 21, wherein a plurality of end effectors cooperatively attach to the plurality of independent tags to move the object.

23. The method of claim 15, wherein coupling the independent tag comprises analyzing the object to select, from a plurality of independent tags, the independent tag, wherein the independent tag comprises an optimal object attachment interface for grasping the object.

24. The method of claim 15, wherein coupling the independent tag comprises analyzing the object to identify an optimal location on the object to minimize torque of the object relative to the end effector, and coupling the independent tag to the optimal location.

25. A method, comprising:
coupling an independent tag to a dish, the independent tag having a dish attachment interface to grasp the dish and an end effector attachment interface to mechanically interface with an end effector of a robot;
positioning the end effector proximal to the end effector attachment interface;
actuating the end effector to connect with the end effector attachment interface; and
actuating the end effector of the robot to move the dish.

* * * * *